United States Patent
Miyata

(10) Patent No.: US 9,317,787 B2
(45) Date of Patent: Apr. 19, 2016

(54) TECHNIQUE FOR INFORMATION PROCESSING DEVICE

(71) Applicant: BROTHER KOGYO KABUSHIKI KAISHA, Nagoya, Aichi (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/602,636

(22) Filed: Jan. 22, 2015

(65) Prior Publication Data
US 2015/0205549 A1 Jul. 23, 2015

(30) Foreign Application Priority Data
Jan. 22, 2014 (JP) ................................. 2014-009597

(51) Int. Cl.
G06F 15/00 (2006.01)
G06K 15/00 (2006.01)
G06F 3/12 (2006.01)

(52) U.S. Cl.
CPC ............ *G06K 15/007* (2013.01); *G06F 3/1205* (2013.01); *G06F 3/1267* (2013.01); *G06F 3/1288* (2013.01); *G06F 3/1292* (2013.01)

(58) Field of Classification Search
CPC ... G06F 3/1227; G06F 3/1292; G06F 3/1288; G06K 15/007
USPC ........................................................ 358/1.15
See application file for complete search history.

(56) References Cited

U.S. PATENT DOCUMENTS

2013/0128306 A1* 5/2013 Takahashi ............ G06F 3/1204
358/1.15
2013/0179961 A1 7/2013 Abe

FOREIGN PATENT DOCUMENTS

JP 2013-117748 A 6/2013

* cited by examiner

*Primary Examiner* — Saeid Ebrahimi Dehkordy
(74) *Attorney, Agent, or Firm* — Scully, Scott, Murphy & Presser, P.C.

(57) ABSTRACT

An information processing device may have an operating system installed therein. The operating system may include a share function for controlling data transfer between a share source application and a share destination application. The information processing device may transfer, to the share destination application via the share function of the installed operating system, property information indicating a property of a particular file identified by the share source application, generate, based on the property information, a unique character string unique to the particular file, and store the unique character string and the particular file in association with each other in a storage unit.

17 Claims, 6 Drawing Sheets

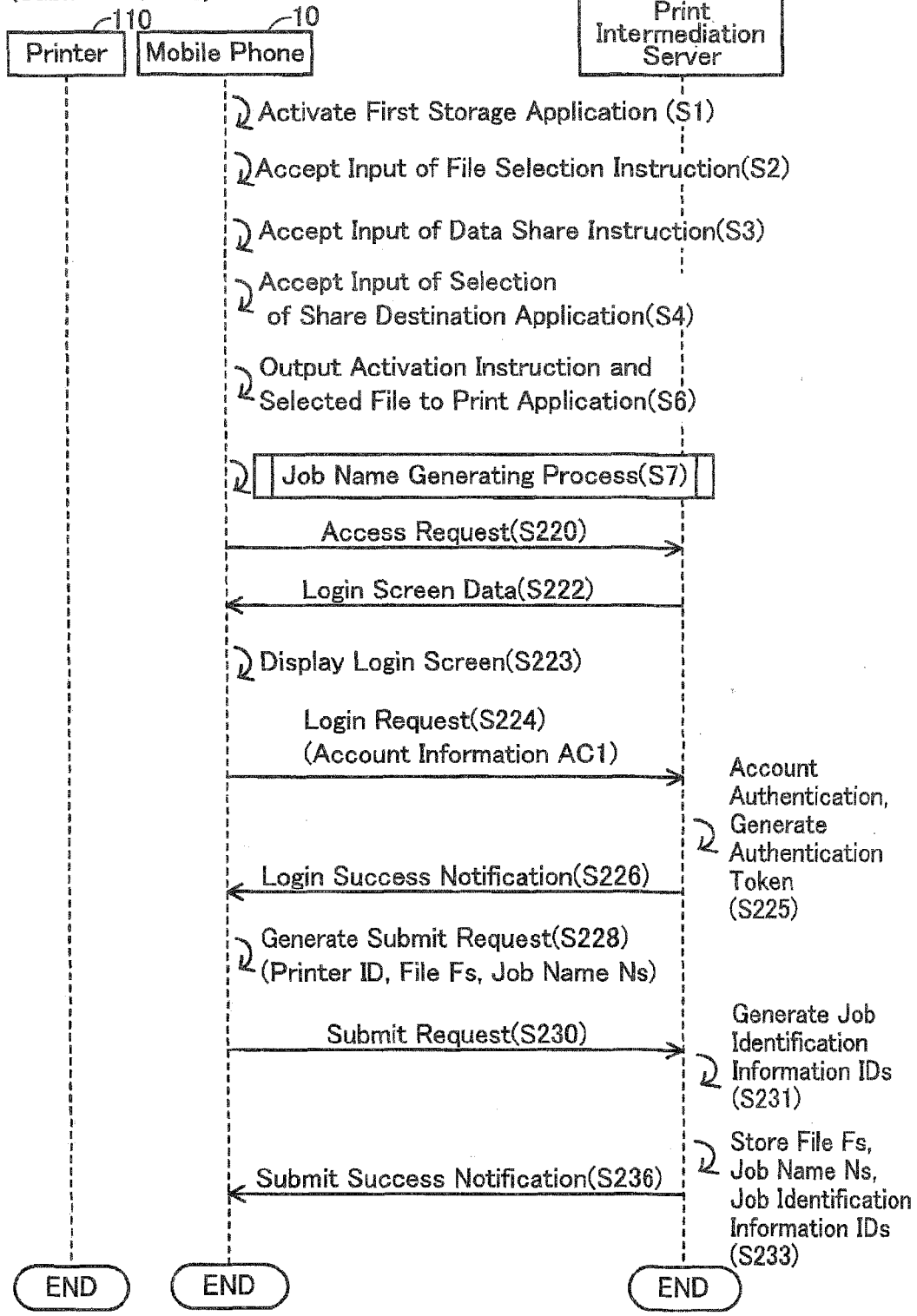

FIG. 3
(Print Process)

| Printer (110) | Mobile Phone (10) | Print Intermediation Server (100) |
|---|---|---|

- Activate Print Application + Print Operation (S260)
- Login Request (S261) → 
- Account Authentication, Generate Authentication Token (S262)
- ← Login Success Notification (S263)
- Generate File List Request (S265) (Authentication Token, Printer ID)
- File List Request (S280) →

X1:
Account Information AC1,
Printer ID,
Files F1 to F11,
Job Names N1 to N11,
Job Identification Information ID1 to ID11

- ← File List (S282) (Job Names N1 to N11, Job Identification Information ID1 to ID11)
- Display Job Name Selection Screen (S283)
- Accept Selection of Job Name (S285)
- Display Message (S286)
- Print Instruction (S288) (Job Identification Information ID1) ←
- Print Data Request (S290) (Authentication Token, Job Identification Information ID1) →
- Convert Process (S295) (File F1 → Print Data D1)
- ← Print Data D1 (S300)
- Print Process (S305)

END  END  END

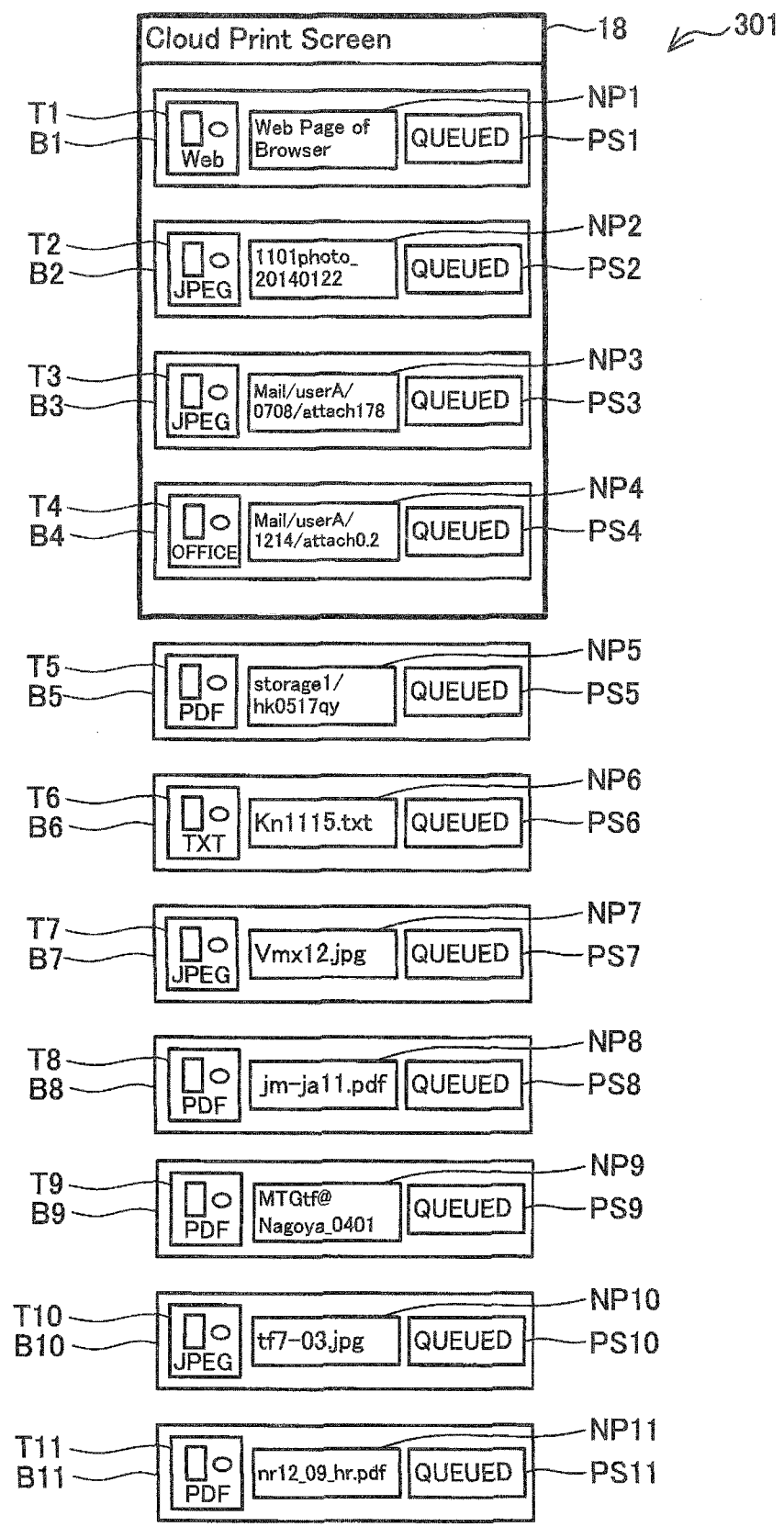

TECHNIQUE FOR INFORMATION PROCESSING DEVICE

CROSS-REFERENCE TO RELATED APPLICATIONS

This application claims priority to Japanese Patent Application No. 2014-009597, filed on Jan. 22, 2014, the contents of which are hereby incorporated by reference into the present application.

TECHNICAL FIELD

The present specification discloses a technique for an information processing device in which various kinds of data can be shared between a plurality of applications.

DESCRIPTION OF RELATED ART

Portable terminals are available which have a function that is referred to as a "share function". The share function is a function for transferring data from one application operated by a user to another application to cause the other application to process the data. Further, a cloud print service is known.

SUMMARY

A configuration may be supposed in which another application assigns a character string including merely consecutive numbers as an identification character string of data that was transferred thereto from one application. In such a case, even if a user looks at the identification character string, it is difficult for the user to distinguish what the data that was transferred from the one application to the other application is.

The present specification discloses a non-transitory computer-readable recording medium storing computer-readable instructions as at least a part of a share destination application executed in an information processing device having an operating system installed therein. The operating system may include a share function for controlling data transfer between a share source application and the share destination application. The computer-readable instructions, when executed by a processor of the information processing device, may cause the information processing device to perform: transferring, to the share destination application via the share function of the installed operating system, property information indicating a property of a particular file identified by the share source application; generating, based on the property information, a unique character string unique to the particular file; and storing the unique character string and the particular file in association with each other in a storage unit.

BRIEF DESCRIPTION OF THE DRAWINGS

FIG. 2 shows a sequence chart of a submit process;

FIG. 3 shows a sequence chart of a print process;

FIG. 6 shows an example of a job name selection screen.

EMBODIMENT (Configuration of Communication System)

Figure 1:
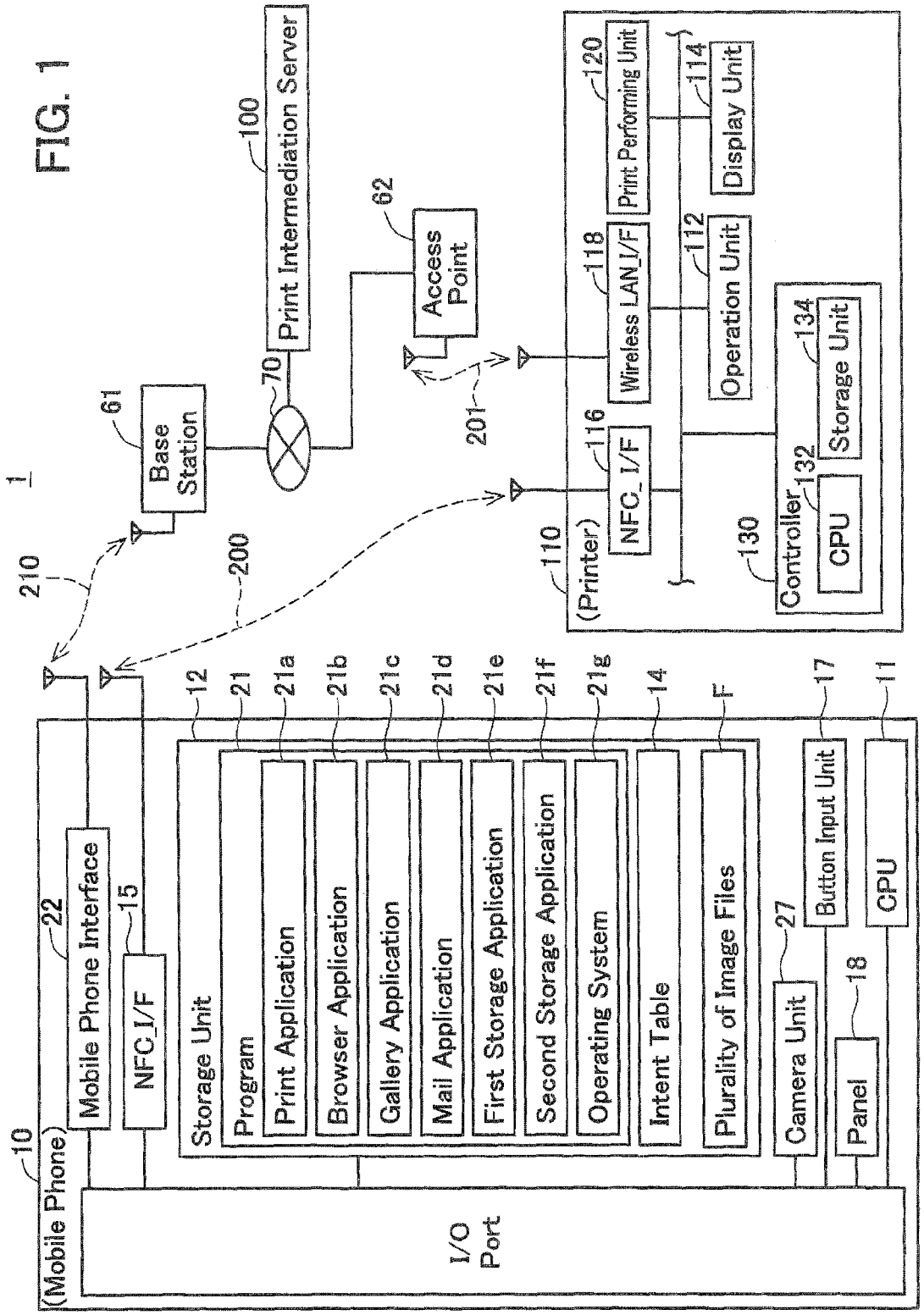
FIG. 1 shows a configuration of a communication system.

FIG. 1 shows a block diagram of a communication system 1. The communication system 1 comprises a mobile phone 10, a printer 110, an access point 62, a print intermediation server 100, and a base station 61. The access point 62 is a known relay device. It is possible for the print intermediation server 100 to communicate with the mobile phone 10 via the Internet 70 and the base station 61. It is also possible for the print intermediation server 100 to communicate with the printer 110 via the Internet 70 and the access point 62.

(Configuration of Mobile Phone 10)

The Android (registered trademark of Google Inc.) platform is installed in the mobile phone 10. The mobile phone 10 mainly comprises a CPU 11, a storage unit 12, an NFC (also referred to as "Near Field Communication") interface 15, a button input unit 17, a panel 18, a mobile phone interface 22 and a camera unit 27. The CPU 11 performs control of various functions in accordance with programs stored in the storage unit 12, various kinds of signals that are sent and received via the NFC_I/F 15, or the like. The CPU 11 also functions as various means by reading a program. In the present specification the term "interface" is abbreviated as "I/F".

The NFC_I/F 15 is an I/F (that is, an IC chip or a communication circuit) for executing wireless communication 200 (hereunder, referred to as "NFC communication 200") in accordance with the NFC scheme for so-called "short-range wireless communication". The NFC scheme is a wireless communication scheme based on, for example, International Standard ISO/IEC 21481 or 18092. The mobile phone I/F 22 performs wireless communication 210 with the base station 61. The wireless communication 210 may be cellular wireless communication such as 3G or 4G cellular communication. The button input unit 17 includes keys for executing various functions of the mobile phone 10. The button input unit 17 may be integrally formed as a touch panel with the panel 18. The panel 18 displays information of various functions of the mobile phone 10.

The storage unit 12 includes programs 21 and an intent table 14. Note that the storage unit 12 may be constituted by combining a RAM (also referred to as "Random Access Memory"), a ROM (also referred to as "Read Only Memory"), a flash memory, a HDD (also referred to as "hard disk"), an SD card (registered trademark of the SD Association) or the like. The storage unit 12 may be a computer-readable recording medium. The computer-readable recording medium is a non-transitory medium, such as a ROM, RAM, flash memory, hard disk, etc. An electrical signal carrying a program to be downloaded from a server, etc. on the Internet is not included in the non-transitory medium.

The programs 21 includes a print application 21a, a browser application 21b, a gallery application 21c, a mail application 21d, a first storage application 21e, a second storage application 21f, and an operating system 21g (hereunder, referred to as "OS" 21g). The OS 21g is an OS of the Android platform. The print application 21a and the second storage application 21f are each an application for Android.

The print application 21a is an application for executing printing at the printer 110 utilizing the print intermediation server 100. The print application 21a is an application that is provided by the vendor of the printer 110. The print application 21a may be installed in the mobile phone 10 from an unshown server on the Internet, or may be installed in the mobile phone 10 from a medium that is shipped together with the printer 110.

The browser application 21b is an application for displaying Web data acquired from the print intermediation server 100 on the panel 18. The gallery application 21c is an application for displaying an image that is based on image data on the panel 18, and performing various kinds of conversion processing (color correction or the like) on the image data. The mail application 21d is an application for sending electronic mail via the wireless communication 210.

The first storage application 21e and the second storage application 21f are applications for storing various kinds of data in an unshown external server and for accessing the data as required. DropBox (registered trademark of Dropbox, Inc.) and Evernote (registered trademark of Evernote Corp.) may be mentioned as examples of these applications.

Further, the respective applications from the print application 21a to the second storage application 21f have an application name for identifying the relevant application. The application name of the print application 21a is "Print Application". The application name of the browser application 21b is "Browser". The application name of the gallery application 21c is "Gallery". The application name of the mail application 21d is "Mail". The application name of the first storage application 21e is "First Storage". The application name of the second storage application 21f is "Second Storage".

The OS 21g is a program that provides basic functions that are shared and utilized by the print application 21a and the mail application 21d. The OS 21g manages data transfer between the print application 21a and the mail application 21d. That is, the OS 21g is equipped with a share function that controls data transfer between a share source application and a share destination application. In order for an application to be utilized as a share destination application by the share function of the OS 21g, it is necessary for the relevant application to declare in advance to the OS 21g the data formats it is possible to input to and output from the application. When application linking is to be performed, the linking source application and the linking destination application send and receive data that is the object of the sharing process in a data format defined in the OS 21g. Application linking is also referred to as "data sharing". Text format, JPEG (also referred to as "Joint Photographic Experts Group") format, and PDF format (also referred to as "Portable Document Format") may be mentioned as examples of data formats.

A method of managing data input and output utilizing the print application 21a will now be described as an example. In the following example, a situation is described in which the print application 21a declares to the OS 21g that the print application 21a can operate as a share destination application under conditions that satisfy the following declaration character strings.

"TYPE: Text ACTION: SEND, VIEW"
"TYPE: JPEG ACTION: SEND, VIEW"
"TYPE: PDF ACTION: SEND, VIEW"
"TYPE: Office ACTION: SEND, VIEW"

Here, "TYPE" is information that represents the format of data that the application making the declaration is capable of accepting as a share destination application utilizing application linking. Further "ACTION: SEND" is information indicating that the application making the declaration is capable of accepting, by application linking, an instruction for an operation that sends data. In the present specification, an instruction for an operation with respect to application linking is also described simply as an "action". Further, "ACTION: VIEW" is information indicating that the application making the declaration is capable of accepting, by application linking, an action for displaying data to a user. Note that the declaration character strings described above represent one example. For example, another format (for example, PNG or GIF format) may be declared with respect to "TYPE". Further, actions other than "SEND" and "VIEW" may also be declared.

An example of a method by which the print application 21a makes a declaration to the OS 21g will now be described. The vendor of the print application 21a creates an installation package that includes a program file and an auxiliary information file. When an installer of the OS 21g extracts the installation package and installs the print application 21a in the mobile phone 10, the print application 21a and the auxiliary information file are stored in the storage unit 12. The aforementioned declaration character strings are described in the auxiliary information file. The declaration character strings may be described in XML (also referred to as "Extensible Markup Language") format. The OS 21g interprets the declaration character strings included in the auxiliary information, and recognizes what kind of data formats and also what kind of actions the print application 21a can accept with respect to application linking. Thereafter, it is possible to link another application and the print application 21a.

The storage unit 12 also stores a plurality of files F. Each of the plurality of files F is, for example, a file showing an image that was photographed using the mobile phone 10. Each of the plurality of files F may be a file of any format. For example, the respective files may be in a bitmap format such as JPEG format, may be in vector format, or may be in text format.

The intent table 14 is a region for storing intents. The term "intent" refers to information that, in the Android platform, acts as a message that is exchanged between the respective applications. By utilizing an intent, it is possible to call another application, or perform a screen transition within an application or the like. That is, utilizing an intent makes it possible to mediate between a share source application and a share destination application within Android.

The contents of an intent will now be described. An intent is a character string. More specifically, an intent includes an index character string that shows the kind of information, and an information character string that follows the index character string. Therefore, hereunder, "kind of information: information character string" is described as a specific example of an intent. A character string "Action" that indicates an "ACTION" field, a character string "Type" that indicates a "TYPE" field, and a character string "Data" or "Extras" that indicates an auxiliary information field may be mentioned as examples of the index character string. The fields for auxiliary information include a field for "DATA", "EXTRA" and the like. The "TYPE" field may include information representing, in MIME (also referred to as "Multipurpose Internet Mail Extension") format, the format of data to be transferred by application linking. For example, in a case where the "TYPE" field includes the term "image", the format of data to be transferred by application linking may be image data. For example, in a case where the "TYPE" field includes the term "text", the format of data to be transferred by application linking may be text data. The "DATA" field may include information showing, in URI (also referred to as "Uniform Resource Identifier") format, information that relates to data to be shared by a "VIEW" action. The relevant information may also be expressed as a Uri class. The "EXTRA" field may include various kinds of information for passing to the application that is a share destination.

A plurality of fields such as "TEXT", "SUBJECT" and "STREAM" may also exist within the "EXTRA" field. The "TEXT" field may include text information that is sent to a share destination application by a "SEND" action. The "SUBJECT" field may include a subject character string that shows a summary description of the data that is sent to the share destination application by a "SEND" action. The title of a file may be mentioned as one example of a subject character string. Note that the "SUBJECT" field need not include a subject character string. The "STREAM" field may include a URI that represents the location of data that is to be sent to the share destination application by a "SEND" action. The data may be sent by a data stream system. A URI that is included in the "STREAM" field may be a URI that indicates a region that buffers a data stream.

(Specific Examples of Intents)

Specific examples of intents that the respective applications from the print application 21a to the second storage application 21f output when executing the share function are described hereunder.

In a state in which a web page is being displayed, the browser application 21b outputs the following intents in response to operation of a "Send" button on the screen.

"Application identification information: com.browser.1234, ACTION: SEND, TYPE: text/plane"

"Auxiliary information: (TEXT)String[https://www.abc.com/home/support]"

Here, the string from "https://" onwards is the URL of the page that is being displayed.

In a state in which one item of image data in JPG format among a plurality of items of image data in the portable phone 10 is being displayed, the gallery application 21c outputs the following intents in response to operation of a "Share" button on the screen.

"Application identification information: com.gallery.1111, ACTION: SEND, TYPE: image/jpeg"

"Auxiliary information: (STREAM) String[file://phone/image/1101photo.jpg]"

Here, "[file://phone/image/1101photo.jpg]" is the file path of the JPG file that is being displayed. Further, in the present embodiment, a case where the date of photographing the JPG file that is being displayed is Jan. 22, 2014 is described as an example.

In a state in which an electronic mail to which JPG data is attached is being displayed, the mail application 21d outputs the following intents in response to operation of a "Share Attached File" button on the screen.

"Application identification information: com.mail.bz, ACTION: SEND, TYPE: image/jpeg"

"Auxiliary information: (STREAM) String[content://mail/userA/0708/attach178]"

Here, "content://mail/userA/0708/attach178" is the URI of the attached JPG file.

In addition, in a state in which an electronic mail to which Office data is attached is being displayed, the mail application 21d outputs the following intents in response to operation of the "Share Attached File" button on the screen.

"Application identification information: com.mail.bz, ACTION: SEND, TYPE: application/office"

"Auxiliary information: Uri:content://mail/userA/1214/attach0.2"

Here, the string from "content://" onwards is the URI of the attached Office file. "Uri:" is an index character string of a lower level. Note that, in a state in which an electronic mail to which PDF data is attached is being displayed, the TYPE of the intent that is output in a case where the "Share Attached File" button is operated is "application/pdf".

In a state in which one file among a plurality of text, JPG and PDF files stored in an unshown network storage is being displayed, the first storage application 21e outputs the following intents in response to operation of an "Export" button on the screen.

"Application identification information: com.store001.bsk, ACTION: SEND, TYPE: text/plane"

"Auxiliary information: (TEXT)String[https://storage1/hk0517qy]"

Here, "https://storage1/hk0517qy" is the URI of the file (for example, PDF file) that is being displayed.

Further, in a state in which one file among a plurality of text files stored in an unshown network storage is being displayed, the first storage application 21e outputs the following intents in response to operation of the "Share" button on the screen.

"Application identification information: com.store001.bsk, ACTION: VIEW, TYPE: text/plane"

"Auxiliary information: Uri:file://sdcard/storage1/data/kn1115.txt]"

Here, "file://sdcard/storage1/data/kn1115.txt" is the file path of the file that is being displayed. The relevant file path is a path of an unshown SD card that is a constituent element of the storage unit 12. A case where a file stored in the storage is copied to the mobile phone and the copied file is displayed may be mentioned as one example of a case where a file path of an SD card is used.

In addition, in a state in which one file among a plurality of JPG files stored in an unshown network storage is being displayed, the first storage application 21e outputs the following intents in response to operation of the "Share" button on the screen.

"Application identification information: com.store001.bsk, ACTION: VIEW, TYPE: image/jpeg"

"Auxiliary information: Uri:file://sdcard/storage1/data/Vmx12.jpg]"

Here, "file://sdcard/storage1/data/Vmx12.jpg" is the file path of the file that is being displayed. Note that, in a state in which a PNG file or a GIF file is being displayed, the TYPE of the intent that is output in a case where the "Share" button is operated is "image/png" or "image/gif".

Further, in a state in which one file among a plurality of PDF files stored in an unshown network storage is being displayed, the first storage application 21e outputs the following intents in response to operation of the "Share" button on the screen.

"Application identification information: com.store001.bsk, ACTION: VIEW, TYPE: application/pdf"

"Auxiliary information: Uri:file://sdcard/storage1/data/jm-ja11.pdf]"

Note that, in a case where the "Share" button is operated in a state in which an Office file is being displayed, the TYPE of the intent that is output is "application/office".

Intents that the second storage application 21f outputs will now be described. In the present embodiment, a case in which a "title" is set for each file stored in an unshown network storage will be described as an example. In a state in which one file among a plurality of text, JPG and PDF files stored in a network storage is being displayed, the second storage application 21f outputs the following intents in response to operation of an "Output" button on the screen.

"Application identification information: com.dat123.143, ACTION: SEND, TYPE: text/plane"

"Auxiliary information: (TEXT)String[https://dat123/fold/Fx4-00]"

"Auxiliary information: (SUBJECT):String[MTG-tf@Nagoya_0401]"

Here, "https://dat123/fold/Fx4-00" is the URI of the file (for example, a PDF file) that is being displayed. Further, "MTG-tf@Nagoya_0401" is the title that is added to the file that is being displayed.

In a state in which one file among a plurality of JPG files stored in a network storage is being displayed, the second storage application 21f outputs the following intents in response to operation of the "Share" button on the screen.

"Application identification information: com.dat123.143, ACTION: VIEW, TYPE: image/jpeg"

"Auxiliary information: (STREAM)String[file://sdcard/dat123/fold/tf7-03.jpg]"

Here, "file://sdcard/dat123/fold/tf7-03.jpg" is the file path of the file that is being displayed.

Further, in a state in which one file among a plurality of PDF files stored in a network storage is being displayed, the second storage application 21f outputs the following intents in response to operation of the "Share" button on the screen.

"Application identification information: com.dat123.143, ACTION: VIEW, TYPE: application/pdf"

"Auxiliary information: Uri:content://dat123/fold/nr12_09_hr.pdf"

Here, "content://dat123/fold/nr12_09_hr.pdf" is the file path of the file that is being displayed.

(Configuration of Printer 110)

The printer 110 is a peripheral device that is capable of performing a print function (that is, a peripheral device of a PC or the like). The printer 110 comprises an operation unit 112, a display unit 114, an NFC interface 116, a wireless LAN (also referred to as "Local Area Network") interface 118, a print performing unit 120 and a controller 130. The respective units 112 to 130 are connected to a bus line (reference symbol is omitted).

The operation unit 112 includes a plurality of keys. A user can issue various instructions to the printer 110 by operating the operation unit 112. The display unit 114 is a display for displaying various kinds of information. The print performing unit 120 is a printing mechanism such as an inkjet or laser printing mechanism. The configuration of the NFC_I/F 116 is the same as the configuration of the NFC_I/F 15 that is described above, and hence a description thereof is omitted here.

The wireless LAN_I/F 118 is an I/F (that is, an IC chip or communication circuit) for executing wireless communication (hereunder, referred to as "Wi-Fi communication") in accordance with a Wi-Fi system that is defined by the Wi-Fi Alliance. The Wi-Fi system is, for example, a wireless communication system based on the IEEE (referred to as The Institute of Electrical and Electronics Engineers, Inc.) 802.11 standards and standards (for example, 802.11a, 11b, 11g, 11n, etc.) conforming to the IEEE 802.11 standards. The wireless LAN_I/F 118 may be an I/F for executing wireless communication through an access point (that is, infrastructure-based wireless communication), or may be an I/F for executing wireless communication without passing through an access point (for example, ad-hoc wireless communication or wireless communication according to the Wi-Fi Direct system).

The controller 130 comprises a CPU 132 and a storage unit 134. The CPU 132 is a processor that executes various kinds of processing in accordance with an unshown program stored in the storage unit 134. The storage unit 134 is constituted by a RAM or a ROM or the like. Similarly to the storage unit 12, the storage unit 134 may be a computer-readable storage medium.

(Configuration of Print Intermediation Server 100)

The print intermediation server 100 is a server that is provided on the Internet, and may be a server provided by an enterprise that is different to the vendor of the printer 110 or may be a server provided by the vendor of the printer 110.

The print intermediation server 100 is a server for executing printing intermediation between an external device (for example, the mobile phone 10) and a printer (for example, the printer 110). That is, the print intermediation server 100 converts a file that is submitted from an external device to generate print data in a data format that can be interpreted by a printer, and supplies the print data to the relevant printer. Accordingly, even if the external device is not equipped with a printer driver for converting the file to print data, the external device can cause the printer to execute printing of the file by submitting the file to the print intermediation server 100.

(Points to Note Regarding the Description in the Present Specification)

Hereunder, in some cases the CPU 11 that executes a program such as an application or the OS 21g is simply described by only the program name. For example, the description "print application 21a" can mean "the CPU 11 that executes the print application 21a". In the present specification, the description "the CPU 11 of the portable phone 10 receives various kinds of information" includes the technical meaning that "the CPU 11 of the portable phone 10 acquires various kinds of information via the mobile phone I/F 22 and the NFC_I/F 15". Further, the description "the CPU 11 of the portable phone 10 sends various kinds of information" includes the technical meaning that "the CPU 11 of the portable phone 10 outputs various kinds of information via the mobile phone I/F 22 and the NFC_I/F 15".

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, the above described distinction between "data" and "information" is not a strict distinction, and exceptional treatment of these terms is also allowed.

(Advance Preparation)

The user of the mobile phone 10 performs the following advance preparation in order to cause the printer 110 to perform printing by utilizing the print intermediation server 100.

That is, the user of the mobile phone 10, for example, utilizes the mobile phone 10 to apply for an account at the print intermediation server 100, and acquires account information AC1 from the print intermediation server 100. The account information AC1 includes, for example, a user ID and a password. Note that, instead of utilizing the mobile phone 10, the user may utilize another device (for example, an unshown PC or the like) to register the account information AC1 in the print intermediation server 100. Once the account information of the user is registered in the print intermediation server 100, the user can cause the printer 110 to perform printing by utilizing the print intermediation server 100.

(Submit Process: FIG. 2)

A submit process will now be described referring to FIG. 2. The submit process is a process for submitting (that is, registering) a file that is a printing object to the print intermediation server 100 using the print application 21a. Further, the submit process is a process that submits a job name generated by the print application 21a to the print intermediation server 100 in association with the file. In the present embodiment a case in which a file Fs is submitted to the print intermediation server 100 as a result of the file Fs being shared with the print application 21a from the first storage application 21e is described as an example.

In the submit process, the user of the mobile phone 10 need not be present in the vicinity of the printer 110. For example, when the user is visiting a location away from the home or office, the user can submit a file that represents an image that was photographed using the mobile phone 10 to the print intermediation server 100.

In S1, when the user performs an input operation to activate the first storage application 21e through the button input unit 17, the CPU 11 activates the first storage application 21e based on the OS 21g. The first storage application 21e displays on the panel 18 a plurality of images that are represented by the plurality of files F (see FIG. 1) stored in the storage unit 12. An unshown data share button is also displayed on the panel 18. The data share button is a button for inputting an instruction to share a file between the first storage application 21e and another application.

In S2, the CPU 11 accepts an input of a file selection instruction that is input by the user. The input of the file selection instruction may be accepted by detecting a touch input with respect to any one of a plurality of images that are formed by the plurality of files F. In the present embodiment, a file that is selected in this case is described as "file Fs". In S3, the CPU 11 accepts an input of a data share instruction that is input by the user. The input of the data share instruction may be accepted by detecting a touch input with respect to an "Export" button.

In S4, the CPU 11 accepts an input of a selection with respect to a share destination application. More specifically, the CPU 11 displays a list of share destination application candidates on the panel 18. In the example described in the present embodiment, a plurality of buttons showing the print application 21a, the browser application 21b and the mail application 21d are displayed. The input of the selection with respect to the share destination application may be accepted by detecting a touch input with respect to any one of the plurality of buttons. In the present embodiment, a case where the print application 21a is selected as the application that is the share destination is described as an example.

In S6, the CPU 11 outputs an activation instruction and the file that was selected in S2 (that is, the file Fs) to the print application 21a. The CPU 11 activates the print application 21a based on the OS 21g. The file Fs is then transferred to the print application 21a.

Figure 4:
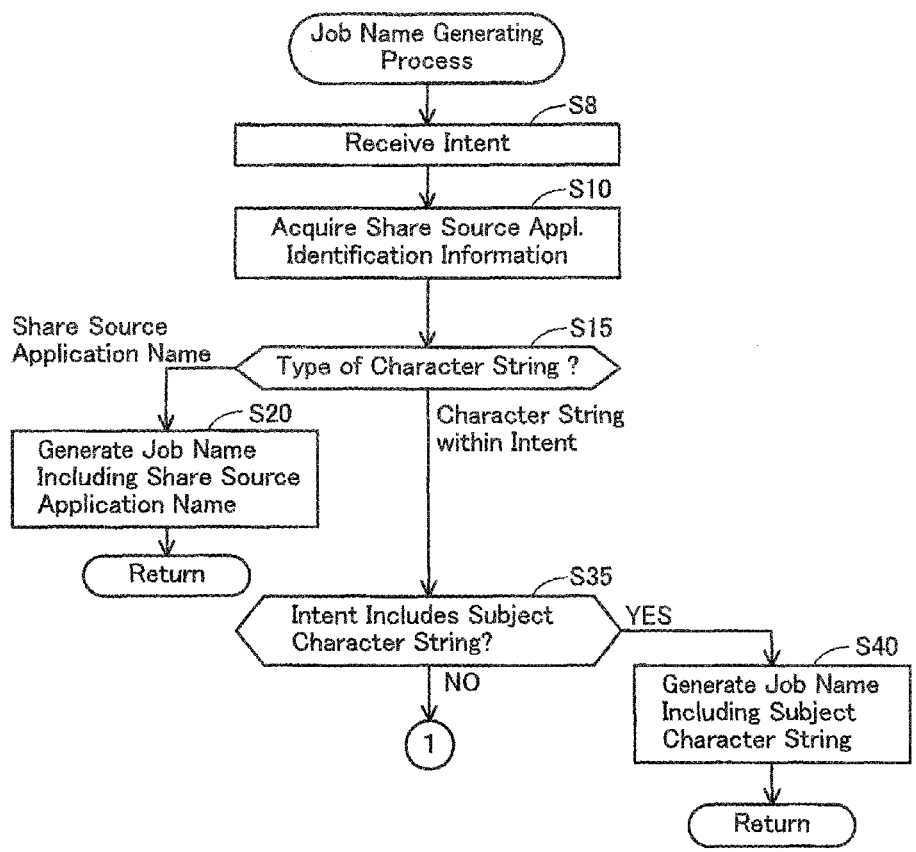
FIG. 4 shows a flowchart of a job name generating process.
Figure 5:
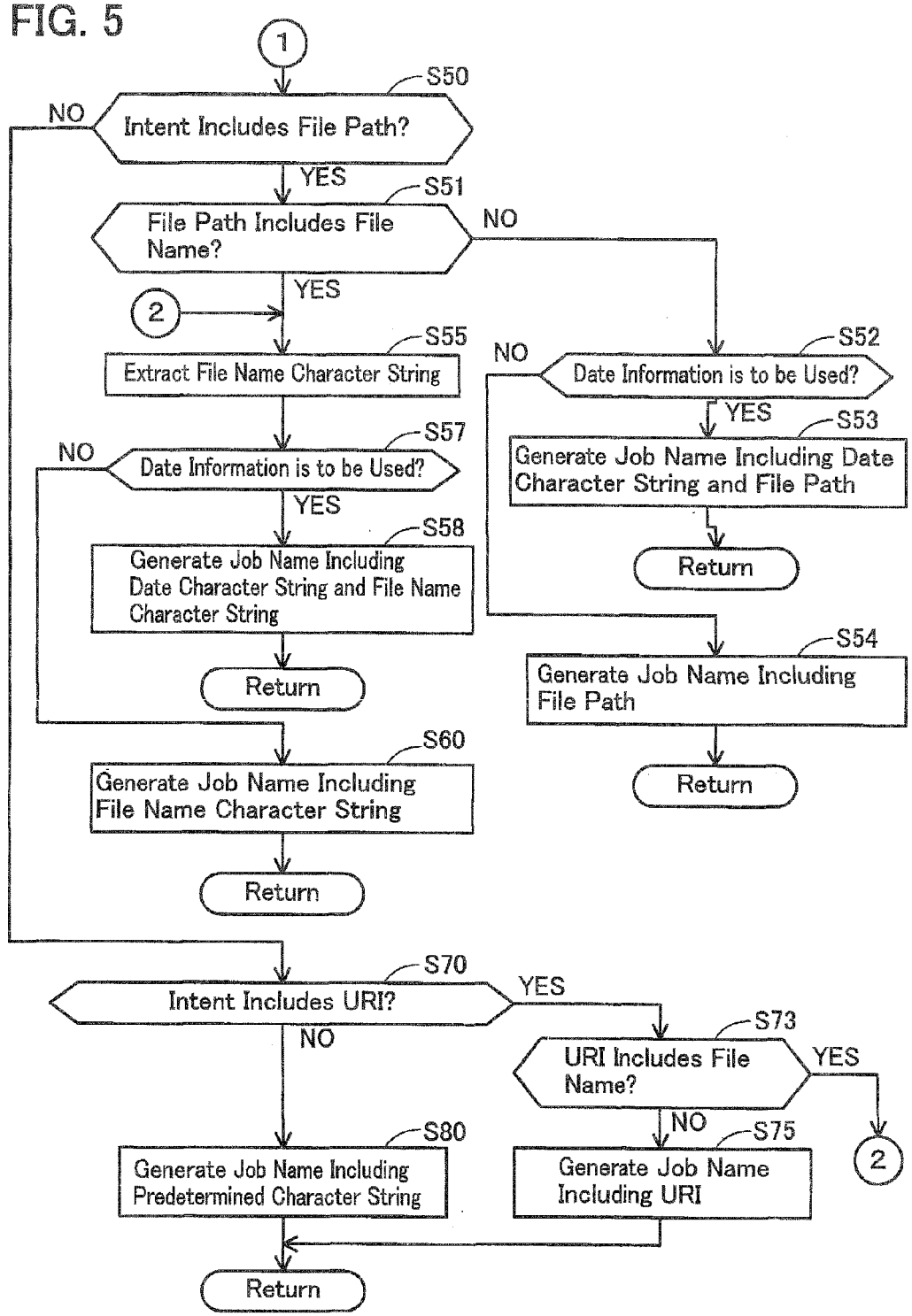
FIG. 5 shows a flowchart of a job name generating process.

In S7, the CPU 11 executes a job name generating process. The contents of the job name generating process will now be described using the flow shown in FIG. 4 and FIG. 5. A job name is a unique character string for identifying a file that is submitted to the print intermediation server 100. In the present embodiment, a case of generating a job name Ns for identifying the file Fs will be described as an example.

In S8, the print application 21a receives an intent through the share function of the OS 21g. More specifically, the print application 21a reads out the intent from the intent table 14.

In S10, the print application 21a acquires share source application identification information that is a character string included in the intent. The share source application identification information is a character string for identifying the type of the share source application. The share source application identification information is a character string that follows the index character string indicating that the relevant information is share source application identification information. In the present embodiment "com.store001.bsk" that is share source application identification information of the first storage application 21e is acquired.

In S15, the print application 21a determines the type of character string to be used for generating the job name Ns. This determination is made in accordance with the type of share source application. More specifically, if the share source application identification information acquired in S10 includes a predetermined first type of character string, it is determined that the job name Ns should be generated using a share source application name that is the application name of the share source application, and the process then proceeds to S20. The character string "com.browser.1234" that is the application identification information of the browser application 21b may be mentioned as an example of the first type of character string. In S20, the print application 21a generates the job name Ns that includes the share source application name. The share source application name may be acquired by the print application 21a querying the OS 21g for the application name of the application that is identified by the share source application identification information. The process then proceeds to S220.

In contrast, if the share source application identification information acquired in S10 does not include the first type of character string, it is determined that the job name Ns should be generated using a character string included in the intent, and the process proceeds to S35. In S35 the print application 21a determines whether or not a "SUBJECT" field in the intent includes a subject character string. The determination may be made by, in a case where an index of auxiliary information is detected from the intent, determining whether or not a lower level index "SUBJECT" is present in information that follows the relevant index. For example, in a case where the "Output" button of the second storage application 21f has been operated, since the character string "Auxiliary information: (SUBJECT):String[MTG-tf@Nagoya_0401]" is included in the intent, an affirmative determination is made in S35.

If an affirmative determination is made in S35 (S35: YES), the process proceeds to S40. In S40 the print application 21a extracts the subject character string from the "SUBJECT" field, and generates the job name Ns that includes the subject character string. For example, when "Auxiliary information: (SUBJECT):String[MTG-tf@Nagoya_0401]" is included in the intent, the subject character string "MTG-tf@Nagoya_0401" is extracted. The process then proceeds to S220.

In contrast, if a negative determination is made in S35 (S35: NO), the process proceeds to S50 in FIG. 5. In S50 the print application 21a determines whether or not a "DATA" or "STREAM" field in the intent includes a file path of the file Fs. The determination may be made by searching to determine whether or not the "DATA" or "STREAM" field includes a predetermined character string that shows a file path. The character string "file://" may be mentioned as one example of the predetermined character string. For example, in a case where the "Share" button of the first storage application 21e was operated, since the character string "Auxiliary information: Uri:file:///sdcard/storage1/data/jm-ja11.pdf]" is included in the intent, an affirmative determination is made in S50. Further, for example, in a case where the "Share" button of the second storage application 21f was operated, since the character string "Auxiliary information: (STREAM)String [file://sdcard/dat123/fold/tf7-03.jpg]" is included in the intent, an affirmative determination is made in S50.

If an affirmative determination is made in S50 (S50: YES), the process proceeds to S51. In S51 the print application 21a determines whether or not the file path includes the file name of the file Fs. A first specific example of the determination method will now be described. The print application 21a searches the file path for a particular symbol for distinguishing a file name character string indicating the file name of the file Fs from other character strings. A final text delimiter among a plurality of text delimiters (for example, a slash) for delimiting directories of the file path may be mentioned as one example of the particular symbol. In a case where the particular symbol is detected, the print application 21a identifies the character string that is distinguished by the particular symbol as the file name character string. A second specific example of the determination method will now be described. The print application 21a performs a search to determine whether or not a character string including a particular symbol indicating an extension (for example, ".jpg" or ".pdf") is included in a plurality of character strings delimited by a text delimiter (for example, a slash). In a case where the character string including the particular symbol indicating the extension is detected, the print application 21a identifies the relevant character string as the file name character string.

For example, if "Auxiliary information: Uri:file://sdcard/storage1/data/jm-ja11.pdf]" is included in the intent, the character string "jm-ja11.pdf" is identified as the file name character string.

If an affirmative determination is made in S51 (S51: YES), the process proceeds to S55. In S55 the print application 21a extracts the file name character string identified in S51 from the file path.

In S57 the print application 21a determines whether or not the job name Ns should be generated using date information. This determination may be made based on whether or not the share source application identification information acquired in S10 includes a predetermined second type of character string. The character string "First Storage" that is the application name of the first storage application 21e may be mentioned as an example of the second type of character string. If an affirmative determination is made (S57: YES), the process proceeds to S58.

In S58, the print application 21a reads out the file path of the file Fs from the intent, and accesses the file Fs based on the file path. Further, the print application 21a opens the file Fs and acquires a date character string showing date information (for example, a photographing date and time or a generated date and time) of the file Fs. The print application 21a then generates the job name Ns that includes the acquired date character string and the extracted file name character string. The process then proceeds to S220. In contrast, if a negative determination is made in S57 (S57: NO), the process proceeds to S60. In S60 the print application 21a generates the job name Ns including the extracted file name character string. The process then proceeds to S220.

Further, if a negative determination is made in S51 (S51: NO), the process proceeds to S52. In S52 the print application 21a determines whether or not the job name Ns should be generated using date information. The contents of S52 are the same as in the above described S57, and hence a description thereof is omitted here. If an affirmative determination is made (52: YES), the process proceeds to S53. In S53, the print application 21a acquires the date character string from the file Fs. The print application 21a then generates the job name Ns that includes the acquired date character string and the entire file path. The process then proceeds to S220. In contrast, if a negative determination is made in S52 (S52: NO), the process proceeds to S54. In S54, the print application 21a generates the job name Ns that includes the entire file path. The process then proceeds to S220.

Further, if a negative determination is made in S50 (S50: NO), the process proceeds to S70. In S70 the print application 21a determines whether or not the auxiliary information of the intent includes a URI showing information relating to the file Fs. The determination may be made by searching to determine whether or not the intent includes a predetermined character string showing a URI (for example, a character string including "://", such as "http://", "https://" or "contents://"). For example, in a case where the "Export" button of the first storage application 21e was operated, since the character string "Auxiliary information: (TEXT)String[https://storage1/hk0517qy]" is included in the intent, an affirmative determination is made in S70. Further, for example, if the "Share Attached File" button of the mail application 21d was operated, since the character string "Auxiliary information: (STREAM)String[content://mail/userA/0708/attach178]" is included in the intent, an affirmative determination is made in S70.

If a negative determination is made in S70 (S70: NO), the process proceeds to S80. In S80 the print application 21a generates the job name Ns that includes a predetermined character string. A character string such as "No Title" may be mentioned as an example of the predetermined character string. Further, a character string showing date information acquired from the OS 21g (for example, information showing the date and time the sharing process was executed) may be mentioned as another example of the predetermined character string. The process then proceeds to S220.

In contrast, if an affirmative determination is made in S70 (S70: YES), the process proceeds to S73. In S73 the print application 21a determines whether or not the URI includes the file name of the file Fs. The contents of the processing in S73 are the same as the processing in S51, and hence a description thereof is omitted here. If an affirmative determination is made (S73: YES), the process returns to S55.

In contrast, if a negative determination is made in S73 (S73: NO), the process proceeds to S75. A case where a sharing process was performed by means of the mail application 21d, the first storage application 21e, the second storage application 21f or the like may be mentioned as an example of a case where a negative determination is made in S73. In S75 the print application 21a generates the job name Ns that includes the entire URI. The process then proceeds to S220.

In S220 of FIG. 2, the print application 21a sends an access request to the print intermediation server 100 via the mobile phone I/F 22. In response to receiving the access request from the mobile phone 10, in S222, the print intermediation server 100 supplies login screen data to the mobile phone 10.

Upon acquiring the login screen data from the print intermediation server 100 via the mobile phone I/F 22, in S223, the print application 21a displays a login screen that is represented by the login screen data, on the panel 18. The user utilizes the button input unit 17 to input the account information AC1 into the mobile phone 10. In S224, the print application 21a supplies a login request that includes the account information AC1 to the print intermediation server 100 via the mobile phone I/F 22.

Upon acquiring the login request from the mobile phone 10, in S225, the print intermediation server 100 authenticates the account information AC1 included in the login request. More specifically, the print intermediation server 100 determines whether or not the account information AC1 included in the login request is already registered in the print intermediation server 100. If the authentication of the account information AC1 succeeds, the print intermediation server 100 generates an authentication token. The authentication token may be a one-time authentication token that is used only for the relevant submit process. In S226 the print intermediation server 100 supplies a login success notification including the authentication token to the mobile phone 10.

In response to acquiring the login success notification from the print intermediation server 100 via the mobile phone I/F 22, in S228 the print application 21a generates a submit request. The submit request includes a printer ID that is stored in the storage unit 12, the file Fs designated by the user, and the job name Ns generated in S7. Note that, in S228, the print application 21a may request the print intermediation server 100 for a list of printer IDs that are associated with the account information AC1, and from the list of printer IDs acquired as a result, select a printer ID as the target for submitting the file Fs. In such a case, in S228, the printer ID included in the submit request is a selected printer ID. A configuration may also be adopted in which a screen for selecting a printer ID is displayed, and a printer ID that is designated by a user input is selected.

In S230 the print application 21a supplies the submit request to the print intermediation server 100 via the mobile phone I/F 22. In S231 the print intermediation server 100 generates job identification information IDs. The job identification information IDs is a unique item of information for identifying a print job that uses the file Fs.

In S233, the print intermediation server 100 stores the file Fs, job name Ns, and job identification information IDs in association with the printer ID included in the submit request. As a result, at the print intermediation server 100, in addition to the account information AC1 and the printer ID, the file Fs, job name Ns, and job identification information IDs are associated and stored. In S236 the print intermediation server 100 sends a submit success notification to the mobile phone 10.

The print application 21a acquires the submit success notification from the print intermediation server 100 via the mobile phone I/F 22. Thus, the submit process ends, that is for submitting the single file Fs to the print intermediation server 100 in association with the job name Ns generated by the print application 21a and the job identification information IDs generated by the print intermediation server 100.

(Print Process: FIG. 3)

Next, a print process through which the mobile phone 10 causes the printer 110 to perform printing will be described referring to FIG. 3. A thick-line arrow in FIG. 3 represents the NFC communication 200. In the print process, the user of the mobile phone 10 must be present in the vicinity of the printer 110. As described later, this is because the mobile phone 10 and the printer 110 must perform NFC communication. Accordingly, for example, after the user returns home after visiting another location, the user utilizes the mobile phone 10 to cause the printer 110 to perform printing.

In the present embodiment, as one example, a case will be described in which respective items of information inside a box X1 on the right side of a dashed line that corresponds to the print intermediation server 100 in FIG. 3 are associated with each other. That is, the account information AC1, the printer ID, files F1 to F11, job names N1 to N11 and job identification information ID1 to ID11 are associated with each other and stored.

In a case where the user of the mobile phone 10 wants to cause the printer 110 to perform printing, in S260 the user activates the print application 21a and executes a print operation. The print operation includes selecting a button indicating "Print" on a screen that is displayed in accordance with the print application 21a.

In S261 the print application 21a supplies a login request including the account information AC1 to the print intermediation server 100 via the mobile phone I/F 22. Upon acquiring the login request from the mobile phone 10, in S262 the print intermediation server 100 authenticates the account information AC1 included in the login request. If the authentication of the account information AC1 succeeds, the print intermediation server 100 generates an authentication token. The authentication token may be a one-time authentication token that is used only for the relevant print process. In S263 the print intermediation server 100 sends a login success notification including the authentication token to the mobile phone 10.

Upon accepting an input of a print instruction, in S265 the print application 21a generates a file list request that includes the authentication token received in S263 and the printer ID. Subsequently, in S280, the print application 21a sends the file list request to the print intermediation server 100 via the mobile phone I/F 22 (that is, by performing the wireless communication 210).

Upon acquiring the file list request from the mobile phone 10, the print intermediation server 100 authenticates the authentication token and the printer ID included in the file list request. Next, if the print intermediation server 100 determines that the authentication token and the printer ID are already registered (that is, if the authentication succeeds), in S282 the print intermediation server 100 supplies a file list to the mobile phone 10. The file list includes the job names (that is, the job names N1 to N11) and the job identification information (that is, the job identification information ID1 to ID11) associated with the authentication token and the printer ID. The file list may also include print status information indicating the print status of a file associated with the authentication token and the printer ID.

Upon acquiring the file list from the print intermediation server 100 via the mobile phone I/F 22, in S283 the print application 21a utilizes the file list to display a job name selection screen on the panel 18. FIG. 6 illustrates an example of a job name selection screen 301. The job name selection screen 301 includes a plurality of button images B1 to B11. The plurality of button images B1 to B11 are images showing the plurality of files F1 to F11, respectively. The plurality of files F1 to F11 are registered in the print intermediation server 100 as a result of the print application 21a acquiring the plurality of files F1 to F11 from respective applications by data sharing and submitting the plurality of files F1 to F11 to the print intermediation server 100 during a plurality of submit processes. Note that, in FIG. 6, the respective button images that do not fit in the display region of the panel 18 are present on the lower side of the panel 18. It is possible to display each of these button images in the display region of the panel 18 by execution of scroll display processing. Note that, the file list may include a file submitted with respect to the printer ID by a method other than a submit process. In such a case, the print application 21a may cause the file that was submitted with respect to the printer ID by a method other than a submit process to be also included in the job name selection screen as a selection choice for the printing object.

The button image B1 is a button image for selecting the file F1 that was acquired from the browser application 21b. The button image B2 is a button image for selecting the file F2 that was acquired from the gallery application 21c. The button images B3 and B4 are button images for selecting the files F3 and F4 that were acquired from the mail application 21d. The button images B5 to B8 are button images for selecting the files F5 to F8 that were acquired from the first storage application 21e. The button images B9 to B11 are button images for selecting the files F9 to F11 that were acquired from the second storage application 21f.

The button image B1 includes a thumbnail image T1, a job name image NP1 and a print status image PS1. The thumbnail image T1 is a reduced image of an image that is formed by the file F1. The job name image NP1 is an image that shows the job name N1 of the file F1. The print status image PS1 is an image that shows the print status of the file F1. The print status image PS1 may be displayed based on print status information included in the file list. "QUEUED" that indicates a print standby state, "ERROR" that indicates a print error state, and "DONE" that indicates that printing is completed may be mentioned as examples of the print status image PS1. The contents of the button images B2 to B11 are the same as the button image B1, and hence a description thereof is omitted here.

In S285, the print application 21a accepts a selection of one or more files among the files F1 to F11. Selection of a file may be performed by detecting a tap input in a region in which the button images B1 to B11 are being displayed. In the present embodiment, the description will be continued by taking as an example a case in which the button image B1 is tapped by the user to select the file F1 as the printing object.

In S286, in response to the selection of a button image, the print application 21a displays a message that prompts the user to bring the mobile phone 10 close to the printer 110 on the panel 18. As a result, the user brings the mobile phone 10 close to the printer 110. By this means, the NFC communication 200 is performed between the NFC_I/F 15 of the mobile phone 10 and the NFC_I/F 116 of the printer 110.

In S288, the print application 21a sends a print instruction to the printer 110 utilizing the NFC communication 200. The print instruction includes an authentication token and the job identification information ID1 that is the job identification information of the file F1 that was selected by the user.

Upon receiving the print instruction from the mobile phone 10, the CPU 132 of the printer 110 generates a print data request. The print data request includes the authentication token and the job identification information ID1 included in the print instruction. In S290, the CPU 132 utilizes a URL of the print intermediation server 100 that is stored in advance in the storage unit 134 to send the print data request to the print intermediation server 100 via the wireless LAN_I/F 118.

Upon receiving the print data request from the printer 110, the print intermediation server 100 authenticates the authentication token included in the print data request. Next, if the print intermediation server 100 determines that the authentication token is already registered (that is, if the authentication succeeds), in S295 the print intermediation server 100 executes a convert process with respect to the file that is identified by the job identification information included in the print data request (that is, the file F1 identified by the job identification information ID1). In the convert process, the file F1 is converted to generate print data D1. For example, in the convert process a file may be converted to print data in PDF format. In S300 the print intermediation server 100 supplies the print data D1 to the printer 110.

The CPU 132 of the printer 110 acquires the print data D1 from the print intermediation server 100 via the wireless LAN_I/F 118. In S305, the CPU 132 supplies the acquired print data D1 to the print performing unit 120. As a result, the print performing unit 120 prints an image that is represented by the print data D1 on a printing sheet. Thus, the user of the mobile phone 10 can acquire a printing sheet on which printing was performed.

(Effects)

A situation may be assumed in which a file is transferred from a share source application to a share destination application using a share function, and the share destination application stores the transferred file in a storage unit. In this case, a configuration is conceivable in which, at a timing that is different to the timing at which the file is stored, the share destination application displays a list of a plurality of files that are stored, and accepts a selection with respect to any one of the files. At such time, if character strings for identifying each of the plurality of files that are stored do not exist, the user identifies each of the plurality of files using the file paths of the files. However, since there is a high possibility that the file paths will be character strings which, from the user's viewpoint, are indistinguishable from each other, it may be difficult for the user to select the file that was transferred from the share source application to the share destination application. In contrast, in a case where the print application 21a of the present embodiment receives (S6) a file from the share source application by means of the share function, the print application 21a can generate, based on the intent, a job name that is a character string that identifies the received file (S7). Further, the print application 21a can cause the print intermediation server 100 to store the generated job name in association with the received file (S230). By this means, since each of a plurality of files stored in the print intermediation server 100 can be identified by the user based on the respective job names, it is possible for the user to easily select the file that was transferred to the share destination application from the share source application.

The print application 21a can cause a job name selection screen that includes the respective job names generated in the job name generating process (S7) (that is, respective job names for identifying the respective files stored in the print intermediation server 100) to be displayed on the panel 18 (S283). Further, by sending a print instruction including job identification information corresponding to the file selected by the user to the printer 110 (S288), the print application 21a can cause the printer 110 to execute a print process using the selected file (S300 and S305). By this means, the user can select, based on the job name from among a plurality of files stored in the print intermediation server 100, a file that was transferred from the share source application to the share destination application, and can cause the printer 110 to perform printing of the selected file.

The print application 21a can generate a job name including a subject character string extracted from the "SUBJECT" field (S40). The subject character string is a character string showing the title of a file or the like and, from the user's viewpoint, is a character string that is highly effective in terms of identifying the file. Thus, it is possible for the user to appropriately select the file that was transferred from the share source application to the share destination application.

The print application 21a can generate a job name including a character string showing the file name of the file that was shared (S60). Since there is a high possibility that a character string that shows the file name was generated by the user, the character string showing the file name is a character string that, from the user's viewpoint, is highly effective in terms of identifying the file. Thus, it is possible for the user to appropriately select the file that was transferred from the share source application to the share destination application.

The print application 21a can generate a job name that includes share source application identification information (S20). By this means, for each of a plurality of files stored in the print intermediation server 100, it is possible to identify which applications the respective files have been sent from, and thus it is possible for the user to select the file that was transferred from the share source application to the share destination application.

In a case where the intent includes a subject character string (S35: YES), the print application 21a can generate a job name that includes the subject character string (S40), while in a case where the intent does not include a subject character string (S35: NO), the print application 21a can generate a job name that includes a file name character string (S60). By this means the subject character string can be included in the job name with priority over the file name character string. Since the order of priority with respect to character string to be used is decided, it is possible to include a more appropriate character string in a job name.

If the print application 21*a* cannot acquire a file name character string of a file that was shared (S51: NO), the print application 21*a* can generate a job name that includes the entire relevant file path (S54). Further, if the intent does not include a character string that can identify the file that was shared (S70: NO), the print application 21*a* can generate a job name that includes a predetermined character string (S80). By this means, irrespective of the contents of the intent, it is possible to reliably generate a job name during the job name generating process (S7).

The print application 21*a* can determine the type of character string that should be used for generating a job name in accordance with the type of share source application (S15). For example, in a case where the share source application is an application that mainly handles image data (for example, the first storage application 21*e*), date information (for example, a date and time of photographing a photograph) that is useful information for identifying image data may be used for generating the job name (S25). Further, for example, in a case where the share source application is an application for communicating with other people (for example, the mail application 21*d*), the share source application identification information may be used for generating the job name (S20). By this means, for each of a plurality of files stored in the print intermediation server 100, it is possible to identify which type of application the respective files have been sent from, and it is thus possible to select the file that was transferred from the share source application to the share destination application.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

In a case where the intent does not include a URI that shows information relating to the file F1 (S70: NO), a job name that include various kinds of character strings may be generated in S80. For example, a job name including the share source application identification information acquired in S10 may be generated in S80.

An intent is not limited to the fields described in the present specification, and may include various kinds of fields. The job name generating process in S7 may be performed using character strings included in the various kinds of fields.

Information that is acquired during the advance preparation is not limited to the account information AC1. For example, the print application 21*a* may acquire a refresh token for acquiring an authentication token from the print intermediation server 100. Further, prior to generating a submit request (S228), and prior to generating a file list request (S265), the refresh token may be sent to the print intermediation server 100 and an authentication token may be acquired. In this case, in S288, the print application 21*a* may send the refresh token to the printer 110. The printer 110 may send the refresh token to the print intermediation server 100 prior to sending a print data request (S290), and may acquire and utilize an authentication token.

Further, a so-called "OAuth" technique may be utilized in the advance preparation. Furthermore, in the advance preparation, an authentication token that can be used in the subsequent submit process or print process may be received from the print intermediation server 100. In this case, when sending the submit request (S230), and when sending the file list request (S280), the print application 21*a* may utilize the authentication token that was received in the advance preparation. Further, in S288, the printer 110 may receive the authentication token that was acquired by the print application 21*a* during the advance preparation, and may utilize the authentication token when sending the print data request (S290).

In S15, various methods may be used to determine the type of character string to be used for generating the job name. For example, the application name of an application that is identified by the share source application identification information may be acquired, and the type of character string may be determined based on whether or not the application name includes the first type of character string (for example: "browser").

In S233, the print intermediation server 100 may convert the file Fs to print job data and store the print job data. In this case, in the print process in FIG. 3, the print job data is supplied to the printer 110 in S300. By this means, the convert process in S295 can be omitted.

In S230, prior to sending the submit request to the print intermediation server 100, the print application 21*a* may convert the file Fs to generate converted data. In this case, in S233 the print intermediation server 100 stores the converted data, the job name Ns and the job identification information IDs in association with the account information AC1 and the printer ID.

In S288, the print application 21*a* may send a print instruction including the job name N1 to the printer 110. In this case, in S295, the print intermediation server 100 may execute the convert process on the file F1 identified by the job name N1.

In S288 the print application 21*a* may send a print instruction including a printer ID to the printer 110. In this case, in S290 the printer 110 may send a print data request including the printer ID to the print intermediation server 100.

When generating the job name N1 in S20 or the like, a time at which the sharing process was executed may be acquired from the OS 21*g*. The job name N1 that includes the share source application name and the time information may then be generated.

In S58, various methods may be used to acquire date information for the file F1. For example, the print application 21*a* may query the OS 21*g* for the photographing date using the file name or the like. Further, a variety of kinds of information may be used as the date information, for example, the date of updating the file or the date of editing the file.

The processing for determining the type of character string (S15) may be omitted. In this case, S15 to S25 may be omitted, and the process may proceed from S15 to S35. Further, the processing for determining whether or not the file path includes the file name (S51) may be omitted. In this case, S50 to S60 may be omitted, and the process may proceed from S35 to S70. Thus, generally speaking, the print application 21*a* may cause the mobile phone 10 to perform at least "transferring", "generating" and "storing". As a specific example, the print application 21*a* may cause the mobile phone 10 to function as at least S12, S40 or S60 or S75, and S230.

In the process for accepting the selection of a file (S285), two or more files may be selected as printing objects.

Instead of executing the NFC communication 200, the printer 110 and the mobile phone 10 may execute short-range wireless communication according to another communication system (for example, wireless communication such as Transfer Jet communication or infrared ray communication). Further, the printer 110 and the mobile phone 10 may execute wireless communication according to a Wi-Fi system instead of executing the NFC communication 200. Furthermore, instead of executing wireless communication, the printer 110 and the mobile phone 10 may execute wire communication. Generally speaking, any kind of communication system may be adopted as long as it is possible for the mobile phone 10 and the printer 110 to communicate with each other.

The mobile phone 10 may perform wireless communication according to a Wi-Fi system, and carry out communication of various kinds of information (for example: the submit request in FIG. 2) with the print intermediation server 100. In a case where the mobile phone 10 is connected by wire to the Internet 70, the mobile phone 10 may perform wire communication and carry out communication with the print intermediation server 100. Generally speaking, any kind of communication system may be adopted as long as it is possible for the mobile phone 10 and the print intermediation server 100 to communicate with each other.

In a case where the printer 110 is connected by wire to the Internet 70, the printer 110 may perform wire communication and carry out communication of various kinds of information (for example: the file list in FIG. 3) with the print intermediation server 100. Generally speaking, any kind of communication system may be adopted as long as it is possible for the printer 110 and the print intermediation server 100 to communicate with each other.

The print intermediation server 100 need not be a single server, and may be a plurality of servers that are constituted by separate members. For example, the print intermediation server 100 may include a first server that executes the respective processing operations shown in the registration process in FIG. 2, and a second server (that is, a second server that is constituted separately from the first server) that executes the respective processing operations shown in the print process in FIG. 3.

A device on which the print application 21a operates is not limited to the mobile phone 10, and may be a stationary PC or may be another device (for example, a television or the like).

In the respective embodiments described above, the respective processing operations illustrated in FIG. 2 to FIG. 5 and the like are realized by the CPU 132 of the printer 110 and the CPU 11 of the mobile phone 10 executing programs stored in the storage units 134 and 12. However, a configuration may also be adopted in which, instead, at least one of the respective processing operations illustrated in FIG. 2 to FIG. 5 and the like is realized by hardware such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A non-transitory computer-readable recording medium storing computer-readable instructions as at least a part of a share destination application executed in an information processing device having an operating system installed therein,
the information processing device comprising: a communication interface configured to perform a communication with a print intermediation server and a printer, the print intermediation server comprising a storage unit; and a display unit,
the operating system including a share function for controlling data transfer between a share source application and the share destination application,
the computer-readable instructions, when executed by a processor of the information processing device, causing the information processing device to perform:
receiving, from the share source application via the share function of the installed operating system, property information indicating a property of a particular file identified by the share source application;
generating, based on the property information, a unique character string unique to the particular file;
sending, to the print intermediation server via the communication interface, the particular file and the unique character string associated with the particular file such that the unique character string and the particular file are stored in association with each other in the storage unit of the print intermediation server;
receiving, from the print intermediation server via the communication interface, M pieces of unique character strings stored in the print intermediation server, the M being an integer equal to 2 or more;
causing the display unit to display a first selection screen, the first selection screen being for causing a user to select a first unique character string from among the M pieces of unique character strings; and
sending, to the printer via the communication interface, a print instruction including the first unique character string selected via the first selection screen, the first unique character string being used by the printer which received the print instruction in order to acquire print data of the particular file associated with the first unique character string and perform printing based on the acquired print data.

2. The non-transitory computer-readable recording medium as in claim 1, wherein
the generating of the unique character string includes:
extracting a subject character string included in the property information, the subject character string indicating a summary of the particular file; and
generating the unique character string including the extracted subject character string.

3. The non-transitory computer-readable recording medium as in claim 1, wherein
the generating of the unique character string includes:
extracting a file name character string included in the property information, the file name character string indicating at least a part of a file name of the particular file; and
generating the unique character string including the extracted file name character string.

4. The non-transitory computer-readable recording medium as in claim 3, wherein the extracting of the file name character string includes extracting the file name character string from a file path of the particular file, the file path being included in the property information.

5. The non-transitory computer-readable recording medium as in claim 1, wherein
in a case where the property information includes both a subject character string indicating a summary of the particular file and a file name character string of a file path of the particular file, the file path being included in the property information, the generating of the unique character string includes:
extracting the subject character string included in the property information; and
generating the unique character string including the extracted subject character string, the unique character string being without the file name character string,
in a case where the property information includes the file name character string and does not include the subject character string, the generating of the unique character string includes generating the unique character string including the file name character string.

6. The non-transitory computer-readable recording medium as in claim 1, wherein
the generating of the unique character string includes generating the unique character string including a file path of the particular file, the file path being included in the property information of the particular file.

7. The non-transitory computer-readable recording medium as in claim 1, wherein
the computer-readable instructions, when executed by the processor of the information processing device, cause the information processing device to further perform:
receiving an application identification character string for identifying the share source application,
wherein the generating of the unique character string includes generating the unique character string including the application identification character string.

8. The non-transitory computer-readable recording medium as in claim 7, wherein
the computer-readable instructions, when executed by the processor of the information processing device, cause the information processing device to further perform:
accepting an input of a receipt instruction for receiving the particular file and the property information from the share source application,
wherein the receiving of the application identification character string is performed in response to the accepting of the input of the receipt instruction.

9. The non-transitory computer-readable recording medium as in claim 1, wherein
the computer-readable instructions, when executed by the processor of the information processing device, cause the information processing device to further perform:
receiving an application identification character string for identifying the share source application,
in a case where the application identification character string is a predetermined first type of character string, the generating of the unique character string includes generating the unique character string including the application identification character string, and
in a case where the application identification character string is a predetermined second type of character string, the generating of the unique character string includes:
accessing the particular file based on a file path of the particular file included in the property information;
acquiring a date character string included in the particular file, the date character string indicating date information of the particular file; and
generating the unique character string including the acquired date character string.

10. The non-transitory computer-readable recording medium as in claim 1, wherein
the computer-readable instructions, when executed by the processor of the information processing device, cause the information processing device to further perform:
accepting an input of a receipt instruction for receiving the particular file from the share source application,
wherein the generating of the unique character string is performed in a period between the accepting of the input of the receipt instruction and the storing of the particular file and the unique character string in the storage unit.

11. The non-transitory computer-readable recording medium as in claim 1, wherein
in a case where the property information does not include a character string for identifying the particular file, the generating of the unique character string includes generating the unique character string including a predetermined character string.

12. The non-transitory computer-readable recording medium as in claim 1, wherein
the computer-readable instructions, when executed by the processor of the information processing device, cause the information processing device to further perform:
receiving an application identification character string for identifying the share source application,
wherein in a case where the property information does not include a character string for identifying the particular file, the generating of the unique character string includes generating the unique character string including the application identification character string.

13. The non-transitory computer-readable recording medium as in claim 1, wherein the generating of the unique character string includes generating the unique character string including a job name of the particular file, the job name being for identifying the printing performed in the printer.

14. The non-transitory computer-readable recording medium as in claim 1, wherein the property information includes at least one of a subject character string, a file path of the particular file, a file name of the particular file, an application identification character string for identifying the share source application, a date character string indicating date information of the particular file, and a URI representing a location of the particular file.

15. The non-transitory computer-readable recording medium as in claim 1, wherein the property information is an intent that is used in the share function in accordance with an Android platform.

16. An information processing device having an operating system installed therein, the operating system including a share function for controlling data transfer between a share source application and a share destination application, the information processing device comprising:
a communication interface configured to perform a communication with a print intermediation server and a printer, the print intermediation server comprising a storage unit;
a display unit;
a processor; and
a memory storing computer-readable instructions as at least a part of the share destination application executed in the information processing device, the computer-readable instructions, when executed by the processor, causing the information processing device to perform:
receiving, from the share source application via the share function of the installed operating system, property information indicating a property of a particular file identified by the share source application;
generating, based on the property information, a unique character string unique to the particular file;
sending, to the print intermediation server via the communication interface, the particular file and the unique character string associated with the particular file such that the unique character string and the particular file are stored in association with each other in the storage unit of the print intermediation server;
receiving, from the print intermediation server via the communication interface, M pieces of unique character strings stored in the print intermediation server, the M being an integer equal to 2 or more;
causing the display unit to display a first selection screen, the first selection screen being for causing a user to select a first unique character string from among the M pieces of unique character strings; and sending, to the printer via the communication interface, a print instruction including the first unique character string selected via the first selection screen, the first unique character string being used by the printer which received the print instruction in order to acquire print data of the particular file associated with the first unique character string and perform printing based on the acquired print data.

17. A method for controlling an information processing device having an operating system installed therein, the operating system including a share function for controlling data transfer between a share source application and a share destination application, the information processing device comprising: a processor; a communication interface configured to perform a communication with a print intermediation server and a printer, the print intermediation server comprising a storage unit; and a display unit, the method comprising:

receiving by the processor, from the share source application via the share function of the installed operating system, property information indicating a property of a particular file identified by the share source application;

generating by the processor, based on the property information, a unique character string unique to the particular file;

sending by the processor, to the print intermediation server via the communication interface, the particular file and the unique character string associated with the particular file such that the unique character string and the particular file are stored in association with each other in the storage unit of the print intermediation server;

receiving by the processor, from the print intermediation server via the communication interface, M pieces of unique character strings stored in the print intermediation server, the M being an integer equal to 2 or more;

causing by the processor the display unit to display a first selection screen, the first selection screen being for causing a user to select a first unique character string from among the M pieces of unique character strings; and sending by the processor, to the printer via the communication interface, a print instruction including the first unique character string selected via the first selection screen, the first unique character string being used by the printer which received the print instruction in order to acquire print data of the particular file associated with the first unique character string and perform printing based on the acquired print data.

* * * * *